United States Patent [19]

Crouch

[11] B 3,924,873
[45] Dec. 9, 1975

[54] REAR WHEEL SUSPENSION FOR A VEHICLE HAVING A BEAM AXLE

[75] Inventor: Stephen John Crouch, 7 Highwayman's Croft, Coventry, Warwickshire, England

[73] Assignee: The Rover Company Limited, Coventry, England

[22] Filed: July 18, 1973

[21] Appl. No.: 380,338

[44] Published under the Trial Voluntary Protest Program on January 28, 1975 as document no. B 380,338.

[30] Foreign Application Priority Data
Aug. 23, 1972  United Kingdom............... 39342/72

[52] U.S. Cl............................ 280/124 R; 267/54 A
[51] Int. Cl.²......................................... B60G 11/42
[58] Field of Search...... 267/54 R, 54 A; 280/124 R

[56] References Cited
UNITED STATES PATENTS

| | | | |
|---|---|---|---|
| 2,973,951 | 3/1961 | Billing | 267/54 A |
| 3,250,546 | 5/1966 | Allison | 267/54 A |
| 3,596,923 | 8/1971 | Nakamura | 267/54 R |
| 3,693,963 | 9/1972 | Leighton | 267/54 A |

*Primary Examiner*—Philip Goodman
*Assistant Examiner*—John A. Carroll
*Attorney, Agent, or Firm*—Brisebois & Kruger

[57] ABSTRACT

A rear beam axle for a road vehicle is mounted on the vehicle body by leaf spring assemblies. The rear end of each assembly is mounted on the body by resilient mounts offering greater resistance to displacement transverse the vehicle then to displacement in the fore and aft direction of the vehicle. The front end of each assembly is mounted on the body by resilient mounts having greater resistance to the displacement of the front end of the assembly relative to the structure in a direction of an oblique axis extending from the second resilient means to a point behind the axle midway between the first resilient means than to displacement of the front end of the assembly in a direction parallel to the ground plane and at right angles to the oblique axis.

4 Claims, 4 Drawing Figures

REAR WHEEL SUSPENSION FOR A VEHICLE HAVING A BEAM AXLE

This invention relates to a rear wheel suspension for a vehicle having a beam axle.

A degree of rear wheel self-steering effect in the form of understeering can benefit vehicle handling and high speed running as well as make the vehicle respond more rapidly to steering inputs. In a vehicle having a beam axle if the motion of the axle relative to the vehicle body, in response to side force on the axle, is rotation about a point then the fore-and-aft location of that point determines whether over or under-steer results. For rear lateral force under-steering the point must be disposed behind the rear axle.

According to the present invention in a rear wheel suspension for a vehicle having a beam axle which supports the vehicle structure by a leaf spring assembly disposed perpendicular to, and at each end of, the axle; the rear end of each assembly being coupled to the vehicle structure by first resilient means having greater resistance to displacement of the rear end of the assembly relative to the structure in a direction parallel to a ground plane and parallel to the axle than to displacement of the rear end in a direction parallel to the ground plane and at right angles to the axle; the improvement comprising the front end of each assembly being coupled to the vehicle structure by second resilient means having greater resistance to the displacement of the front end of the assembly relative to the structure in a direction of an oblique axis extending from the second resilient means to a point behind the axle midway between the first resilient means than to displacement of the front end of the assembly in a direction parallel to the ground plane and at right angles to the oblique axis.

Ground plane is used to refer to a datum plane equivalent to a horizontal road surface on which the vehicle in normal running conditions stand at rest.

An embodiment of the invention will now be described, solely by way of example, with reference to the accompanying drawings of which:

Figure 1:
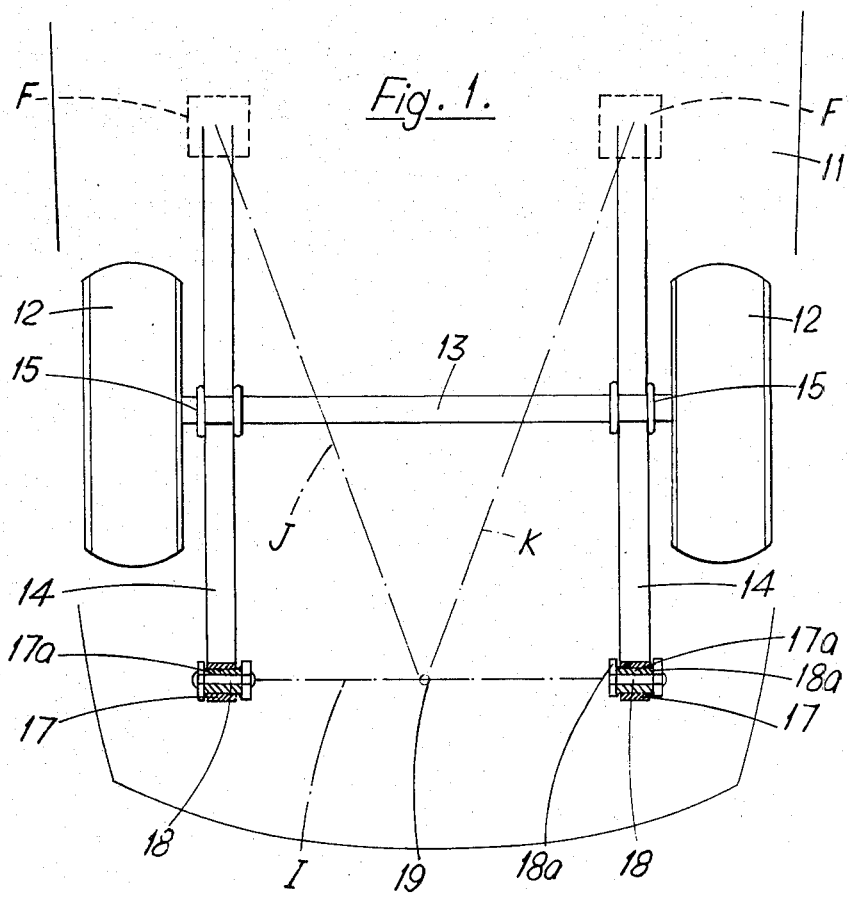
FIG. 1 is a part sectioned plan view of the rear end of a road vehicle.

FIG. 1 shows part of a vehicle structure 11 supported on road wheels 12 by a beam rear axle 13 and a leaf spring assembly 14 at each end of the axle. The centre of each leaf spring assembly 14 is coupled to the beam axle 13 by U-bolts 15. The rear end of the uppermost leaf in the assembly is formed into a scroll 17 enclosing a resilient rubber bush 17a through the centre of which shackle pin 18 extends. The shackle pin 18 secures the rear end of each assembly to vehicle structure 11 by way of brackets 18a. Both shackle pins 18 lie on a common axis I having on it a point 19 disposed midway between the shackle pins 18. The mounting of the rear end of each assembly is such that the greatest resistance to movement of the spring assembly 14 is in the direction of axis I but the least resistance to movement is in the direction of the longitudinal axis of the spring assemblies. Obliques axes J, K extend from the front mounting arrangements of each leaf spring assembly (which is shown enclosed in broken outline F) to point 19.

Three alternative arrangements for the front mountings will now be described with reference to FIGS. 2, 3 and 4.

Figure 2:
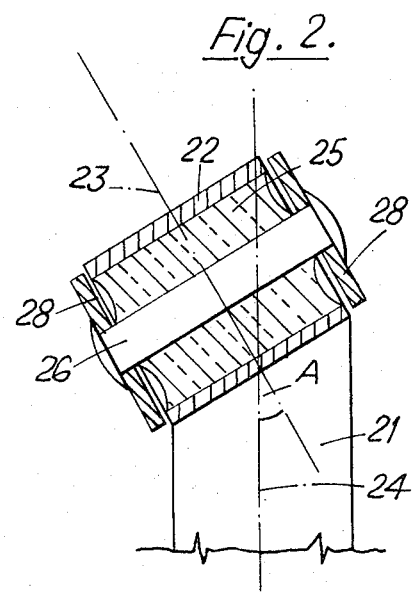
FIGS. 2, 3 and 4 are respectively first, second and third part sectioned plan views of a resilient mounting suitable for occupying the positions enclosed in broken outline in FIG. 1.

FIG. 2 shows the front end of uppermost leaf 21 of spring assembly corresponding to assembly 14 of FIG. 1. The end of the leaf 21 is formed into a scroll 22 having axis 23 off-set at an angle A to the longitudinal axis 24 of the spring assembly 14. Axis 23 is coincident with axis J of FIG. 1. The scroll 22 has mounted in it a resilient rubber bush 25. The bush 25 has extending through it bolt 26 which links the scroll to the vehicle body by way of brackets 28. The arrangement acts to offer the greatest resistance to movement of the spring assembly 14 in the direction of axis 23 but least resistance to movement in a horizontal direction at right angles to axis 23.

Figure 3:
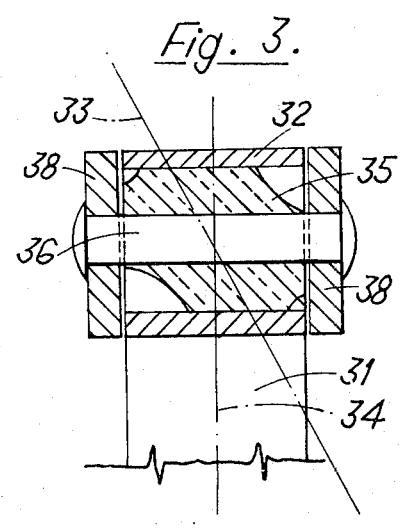

FIG. 3 shows the front end of uppermost leaf 31 of a spring assembly corresponding to assembly 14 of FIG. 1. The end of the leaf 31 is formed into a scroll 32 perpendicular to longitudinal axis 34 of the spring assembly. Rubber bush 35 is secured within the scroll 32 and has passing through it bolt 36 which links the scroll to the vehicle body by way of brackets 38. The bush 35 is shaped, and can further be provided with inserts, so that the bush offers greatest resistance to movement of the spring assembly 14 in the direction of axis 33 but least resistance to movement in the direction perpendicular to axis 33. Axis 33 is coincident with axis J of FIG. 1.

Figure 4:
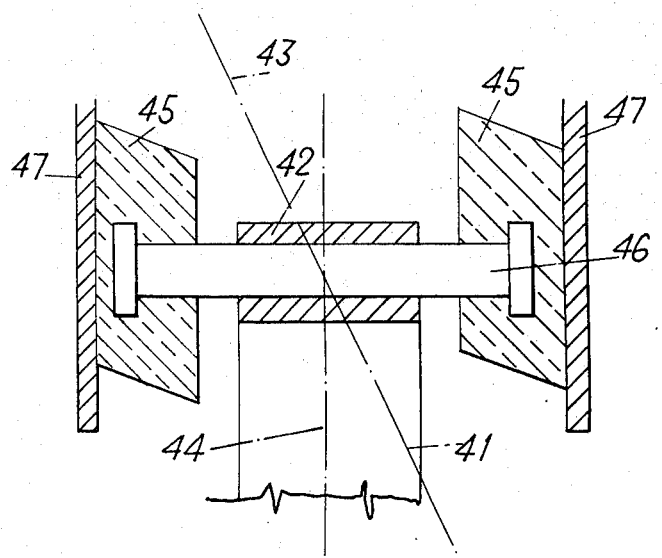

FIG. 4 shows the front end of uppermost leaf 41 of spring assembly corresponding to assembly 14 of FIG. 1. The end of the leaf 41 is formed into a scroll 42 perpendicular to longitudinal axis 44 of the spring assembly. Bolt 46 extends through scroll 42 and is mounted on vehicle structure by way of resilient rubber bushes 45 and brackets 47. The bushes 45 are shaped so that the bushes offer greatest resistance to movement of the spring assembly 14 in the direction of axis 43 but least resistance to movement in the direction of an axis perpendicular to axis 43. Axis 43 is coincident with axis J of FIG. 1.

We claim:

1. In a rear wheel suspension for a vehicle having a beam axle which supports the vehicle structure through two leaf spring assemblies, disposed perpendicular to and near opposite ends of the axle; the rear end of each assembly being coupled to the vehicle structure by rear resilient means having greater resistance to displacement of the rear end of the assembly relative to the structure in a direction parallel to the ground plane and parallel to the axle than to displacement of the rear end in a direction parallel to the ground plane and at right angles to the axle; the improvement comprising:

first front resilient means coupling the front end of one assembly to the vehicle structure and second front resilient means coupling the front end of the other assembly to said structure, said first front resilient means providing greater resistance displacement of the front end of said one assembly relative to the structure in the direction of a first line extending from said first front resilient means to a point behind said axle midway between said rear resilient means than to the displacement of the front end of the assembly in a direction parallel to the ground plane and at right angles to said line, while said second front resilient means provides a greater resistance to the displacement of the front end of the other of said assemblies relative to the structure in the direction of a second line extending from said second front resilient means to said point than to the displacement of the front end of said other assembly in a direction parallel to the ground plane and at right angles to said line.

2. A rear wheel suspension as claimed in claim 1 wherein the front end of said one assembly is in the form of a first scroll bent around an axis perpendicular to said first line, the front end of said other assembly is in the form of a second scroll bent about an axis perpendicular to said second line, said first front resilient means is a first annular bush of resilient material having a longitudinal axis perpendicular to said first line, said second front resilient means is a second annular bush of material having a longitudinal axis perpendicular to said second line, each bush defining an inner and an outer curved surface, said supension comprising means securing the vehicle structure to the inner curved surface of each bush, said first scroll being secured to the outer curved surface of said first bush and said second scroll being secured to the outer curved surface of said second bush.

3. A rear wheel suspension as claimed in claim 1 wherein the front end of said one assembly is in the form of a first scroll and the front end of said other assembly is in the form of a second scroll, said first front resilient means is a first annular bush of resilient material having a longitudinal axis perpendicular to said one assembly, said second front resilient means is a second annular bush of resilient material perpendicular to said other assembly, said suspension comprising means securing the vehicle structure to the inner surface of each bush, said first bush having a maximum thickness of resilient material in the direction of said first line and a minimum thickness in a direction perpendicular thereto, while the second bush has a maximum thickness of resilient material in the direction of said second line and a minimum thickness in a direction perpendicular to said second line.

4. A rear wheel suspension as claimed in claim 1 wherein the front end of said one assembly is secured to a first rigid component having ends projecting outwardly on both sides of said one assembly, while the other assembly is secured to a second rigid component having ends projecting on both sides of said other assembly, said first and second front resilient means consisting of first and second resilient block means respectively, in which block means the ends of said first and second rigid components are respectively mounted, said first block means having a maximum thickness of resilient material in the direction of said first line and a minimum thickness of resilient material in a direction perpendicular to said first line, while said second block means has a maximum thickness of resilient material in the direction of said second line and a minimum thickness of resilient material in a direction perpendicular to said second line.

* * * * *